L. N. VINCENT.
GREASE CUP.
APPLICATION FILED MAR. 30, 1916.

1,195,296.

Patented Aug. 22, 1916.
2 SHEETS—SHEET 1.

Inventor
Louis N. Vincent
By Blackwood Bros.,
Attorneys

L. N. VINCENT.
GREASE CUP.
APPLICATION FILED MAR. 30, 1916.

1,195,296.

Patented Aug. 22, 1916
2 SHEETS—SHEET 2.

Inventor
Louis N. Vincent
By Blackwood Bros.
Attorneys.

UNITED STATES PATENT OFFICE.

LOUIS N. VINCENT, OF PRESCOTT, ARIZONA, ASSIGNOR OF ONE-FOURTH TO CHARLES H. PRESCOTT AND ONE-FOURTH TO GEORGE W. SOMMER, BOTH OF SPOKANE, WASHINGTON.

GREASE-CUP.

1,195,296.   Specification of Letters Patent.   Patented Aug. 22, 1916.

Application filed March 30, 1916.  Serial No. 87,696.

*To all whom it may concern:*

Be it known that I, LOUIS N. VINCENT, residing at Prescott, in the county of Yavapai and State of Arizona, a citizen of the United States, have invented certain new and useful Improvements in Grease-Cups; and I do hereby declare the following to be a full, clear, and exact description of the invention, such as will enable others skilled in the art to which it pertains to make and use the same.

My invention relates to improvements in grease cups particularly for use on the moving parts of machinery, for instance on the connecting rods of a locomotive.

The invention consists in the several features and combination of features as more fully hereinafter described and claimed.

It has for its object to provide means for automatically feeding the grease, said means being operated by the movement of the part of the machinery on which it is mounted.

It further has for its object to provide means for mounting the reciprocable weight which can be renewed when it becomes worn or broken.

It further has for its object to provide means for forming a stop to limit the downward movement of the slidable cup abutment for the weight.

It further has for its object to provide reciprocable means for effecting the automatic feeding of the grease.

It further has for its object to provide means whereby the feeding of the grease can be manually effected if so desired.

It further has for its object to automatically increase the play of the reciprocable means, guide its movement, and automatically keep the extent of its throw the same as the grease feeds.

It further has for its object to provide means whereby the height of the grease in the cup can be ascertained without necessitating the opening of the cup.

It further has for its object to provide automatic means for keeping the grease packed under pressure.

It still further has for its object to provide a grease cup which is simple, inexpensive and durable in construction and convenient and effective in use.

Figure 1:
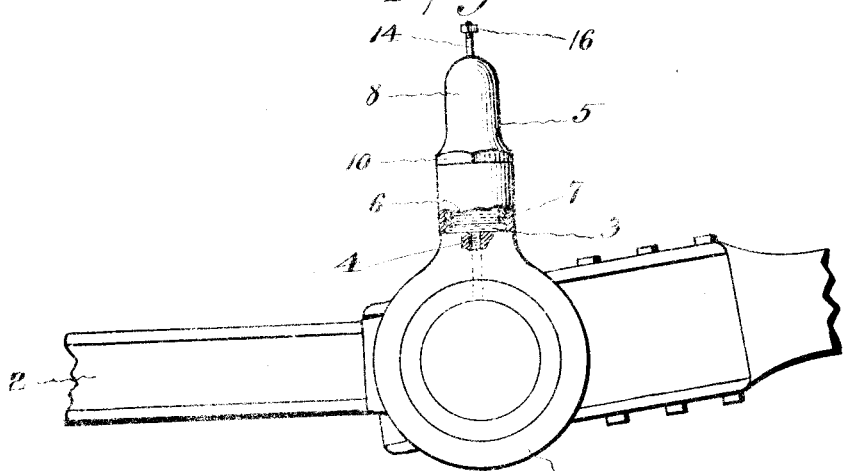
Figure 2:
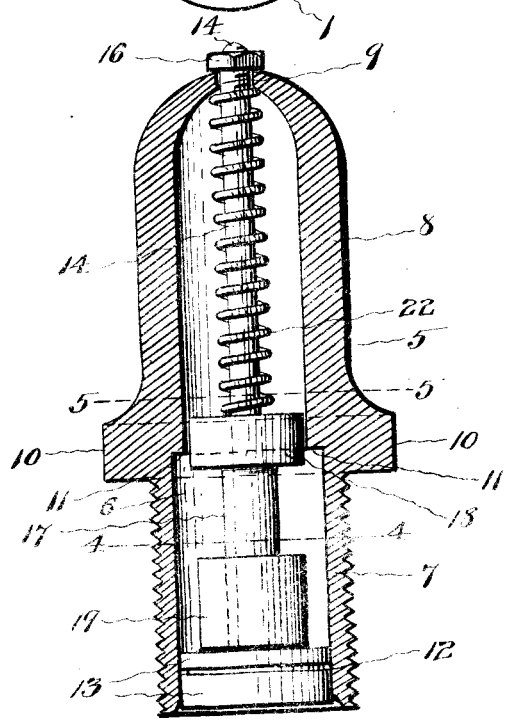
Figure 3:
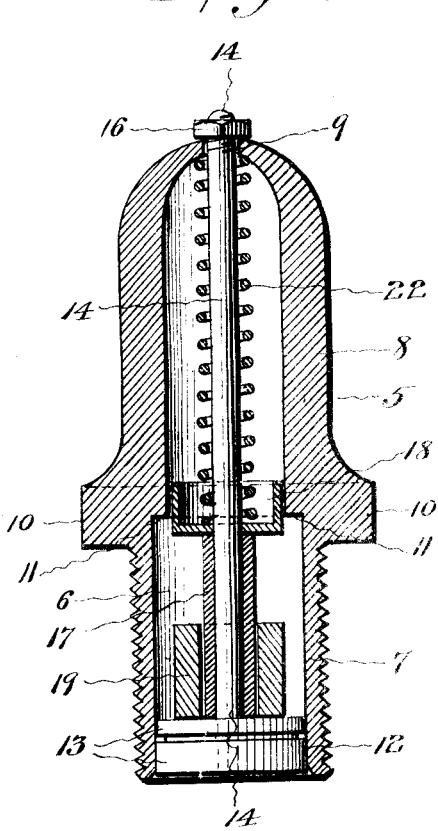
Figure 4:
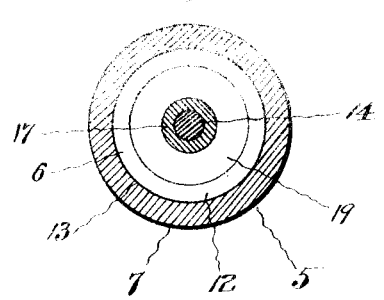
Figure 5:
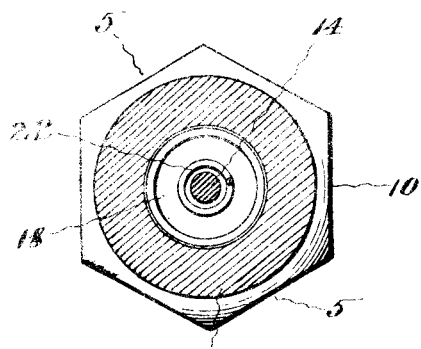
Figure 6:
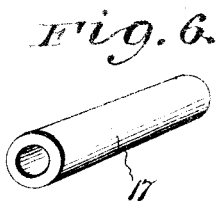

Referring to the drawings: Figure 1 is a side elevation. Fig. 2 is a side elevation with the grease receptacle in section. Fig. 3 is a central vertical section. Fig. 4 is a horizontal section on the line 4—4 of Fig. 2. Fig. 5 is a horizontal section on the line 5—5 of Fig. 2. Fig. 6 is a detail view of the sleeve.

In the drawings in which similar reference characters denote similar parts throughout the several views, 1 represents a collar formed at the end of a pitman 2 and having an interiorly screwthreaded tubular socket or chamber 3 provided with an outlet hole or passage 4, each of said parts being of the usual well known type.

5 is the grease cup, shown cylindrical in form but which may be of any desired shape or form and of a size to accommodate it to the requirements of use, which comprises a grease receptacle 6 having a lower tubular exteriorly screwthreaded portion 7 adapted to be screwed into the interiorly screwthreaded socket or chamber 3, an upper tubular dome shaped portion 8 having a hole 9 at the apex of its top, and an exterior hexagonal portion 10, adapted for the application of a wrench or other suitable tool when it is desired to insert or remove the grease receptacle.

The interior of the dome shaped portion 8 is made of less diameter than the lower portion 7 in order to form a shoulder 11 designed to limit the upward movement of the follower and carry it down when the cup is being turned down onto its seat, thereby forcing grease onto the bearing.

A follower 12 is provided inside the receptacle having spring packing rings 13 for the purpose of maintaining a tight joint between the follower and the receptacle and a stem 14 extends upwardly from the follower and through the hole 9 in the dome shaped portion 8 and is provided with a suitable screwthreaded nut 16.

A sleeve 17 is mounted on and surrounds the stem 14 of the follower, its lower end contacting and resting on the top of the follower, and a weight 19 is provided having a hole 20 therethrough by which it is mounted on the sleeve 17. The weight 19 may be made in varying sizes and shapes to suit different conditions of use.

A cup 18 is mounted on and surrounds the stem 14 of the follower and normally rests on the upper end of the sleeve 17 and a spiral spring 22 is also mounted on the stem 14 of the follower between the cup and the upper interior end of the tubular dome shaped portion 8.

The spiral spring 22 not only serves to normally maintain the cup 18 in contact with the upper extremity of the sleeve 17 and constantly, or at all times, maintains a spring pressure on the cup 18 and the follower 12, thereby supplementing the pressure caused by the weight of the follower on the grease, but also serves as a yielding abutment for the weight 19 during its operation on the stem of the follower.

The sleeve forms a bearing surface for the weight 19 and being readily removable can be replaced by a new sleeve when the old one becomes worn or broken and it also forms a stop to limit the downward movement of the cup 18.

If it is desired to feed the grease when the cup is at rest it is only necessary to push or screw the cap down by hand which will cause the follower to bear on the shoulder and move downward on the grease and cause it to be forced out of the outlet hole into the bearing to be lubricated.

In operation the grease and the follower are placed in the grease receptacle and as the grease cup is vibrated or reciprocated, by the motion of the moving part of the machinery on which it is mounted, the weight is caused to reciprocate on the sleeve between the follower and the cup and as it knocks against the follower it causes the grease to be expelled from the grease receptacle, by the downward pressure of the follower, and through the feed hole or channel of the grease cup.

I do not wish to be understood as limiting myself to the specific details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variations and modifications as properly fall within the scope of my invention and the terms of the following claims.

What I claim is:—

1. In a grease cup, a grease receptacle, a follower having a stem, a sleeve removably mounted on said stem, and a weight reciprocably mounted on said sleeve.

2. In a grease cup, a grease receptacle, a follower having a stem, a sleeve mounted on said stem and a weight reciprocably mounted on said sleeve.

3. In a grease cup, a grease receptacle, a follower having a stem, a sleeve mounted on said stem, a weight reciprocably mounted on said sleeve and means for limiting the movement of the weight.

4. In a grease cup, a grease receptacle, a follower having a stem, a sleeve mounted on said stem, a weight reciprocably mounted on said sleeve and a cup slidably mounted on the stem of the follower.

5. In a grease cup, a grease receptacle, a follower having a stem, a sleeve mounted on said stem, a weight reciprocably mounted on said sleeve and means mounted on the stem of the follower for limiting the movement of the weight.

6. In a grease cup, a grease receptacle, a follower having a stem, a sleeve mounted on said stem, a weight reciprocably mounted on said sleeve and means mounted on the stem of the follower limiting the movement of the weight and abutting against the sleeve on the stem.

7. In a grease cup, a grease receptacle, a follower having a stem, a sleeve mounted on said stem, a weight reciprocably mounted on said sleeve and spring controlled means mounted on the stem of the follower limiting the movement of the weight and abutting against the sleeve on the stem.

8. In a grease cup, a grease receptacle, a follower having a stem, a weight and means on said stem for mounting said weight reciprocably thereon.

9. In a grease cup, a grease receptacle, a follower having a stem, a sleeve mounted on said stem, a weight reciprocably mounted on said sleeve and an abutment for said weight slidably mounted on said stem.

10. In a grease cup, a grease receptacle, a follower having a stem, a slidable cup mounted on said stem, a sleeve also mounted on said stem between the follower and cup and a reciprocable weight mounted on said sleeve.

11. In a grease cup, a grease receptacle, a follower having a stem, a slidable cup and a sleeve mounted on said stem and a weight designed to reciprocate on said sleeve and abut against the follower and slidable cup.

12. In a grease cup, a grease receptacle made dome shaped, a follower therein having a stem mounted in said dome, a sleeve mounted on said stem, a weight reciprocably mounted on said sleeve and an abutment for said weight slidably mounted on said stem.

13. In a grease cup, a grease receptacle, a follower having a stem extending through the grease receptacle, a slidable cup and a sleeve mounted on said stem, a spring mounted on said stem between the grease receptacle and cup and a weight reciprocably mounted on said sleeve between the follower and cup.

14. In a grease cup, a grease receptacle having a dome-shaped upper portion with a hole therein, an exteriorly screwthreaded lower portion, a follower, a stem projecting from said follower through the hole in the dome-shaped upper portion, a sleeve and a slidable cup mounted on said stem and a weight mounted on said sleeve and adapted to be reciprocated thereon.

In testimony whereof I affix my signature in the presence of two witnesses.

LOUIS N. VINCENT

Witnesses:
J. HEATON,
S. E. JOHNSTON.